United States Patent [19]
Chatterton

[11] 3,799,676
[45] Mar. 26, 1974

[54] OPTICAL TRACKING SYSTEM

[75] Inventor: Edward J. Chatterton, Lexington, Mass.

[73] Assignee: The United States of America as represented by the Secretary of the Air Force, Washington, D.C.

[22] Filed: May 26, 1972

[21] Appl. No.: 257,330

[52] U.S. Cl. .............................................. 356/152
[51] Int. Cl. ........................................... G01b 11/26
[58] Field of Search ............... 365/4, 5, 141, 152; 343/6 R, 6 DF, 7 A; 356/141, 152

[56] References Cited
UNITED STATES PATENTS

| | | | |
|---|---|---|---|
| 3,644,043 | 2/1972 | Jones et al. | 356/5 |
| 3,504,182 | 3/1970 | Pizzurro et al. | 356/141 |
| 3,680,958 | 8/1972 | Von Bose | 356/141 |
| 3,619,058 | 11/1971 | Hewlett et al. | 356/5 |
| 3,348,050 | 10/1967 | Bez | 356/4 |
| 3,521,956 | 7/1970 | Froome et al. | 356/5 |
| 3,622,788 | 11/1971 | Briggs | 356/152 X |
| 3,603,686 | 9/1971 | Wyman et al. | 356/152 |
| 3,148,369 | 9/1964 | Zable et al. | 343/6 DF |

OTHER PUBLICATIONS

Masers & Lasers, Graduates of the Harvard University Graduate School of Business Adm., Apr. 30, 1963, pp. 146–151.

Lasers: Devices and Systems, Part III, Vogel and Dulberger, Nov. 10, 1961, pp. 81–85, "Electronics."

*Primary Examiner*—Malcolm F. Hubler

[57] ABSTRACT

An optical tracking apparatus incorporating a radar system to search, acquire and track a co-operating target. A YAG laser illuminator and a tracker which are mounted together at a ground installation cooperate with small retroreflectors mounted on the target to pinpoint its position. The optical signals which are received from the target are processed in optical system detectors. The detectors provide target azimuth and elevation information.

5 Claims, 7 Drawing Figures

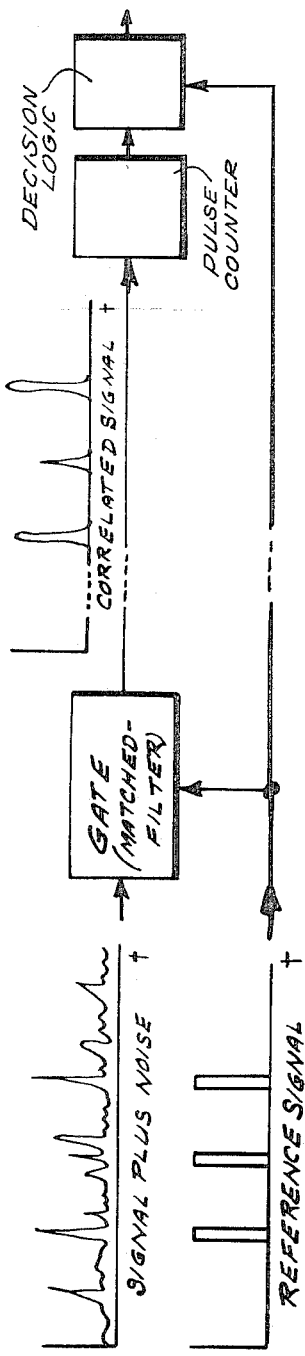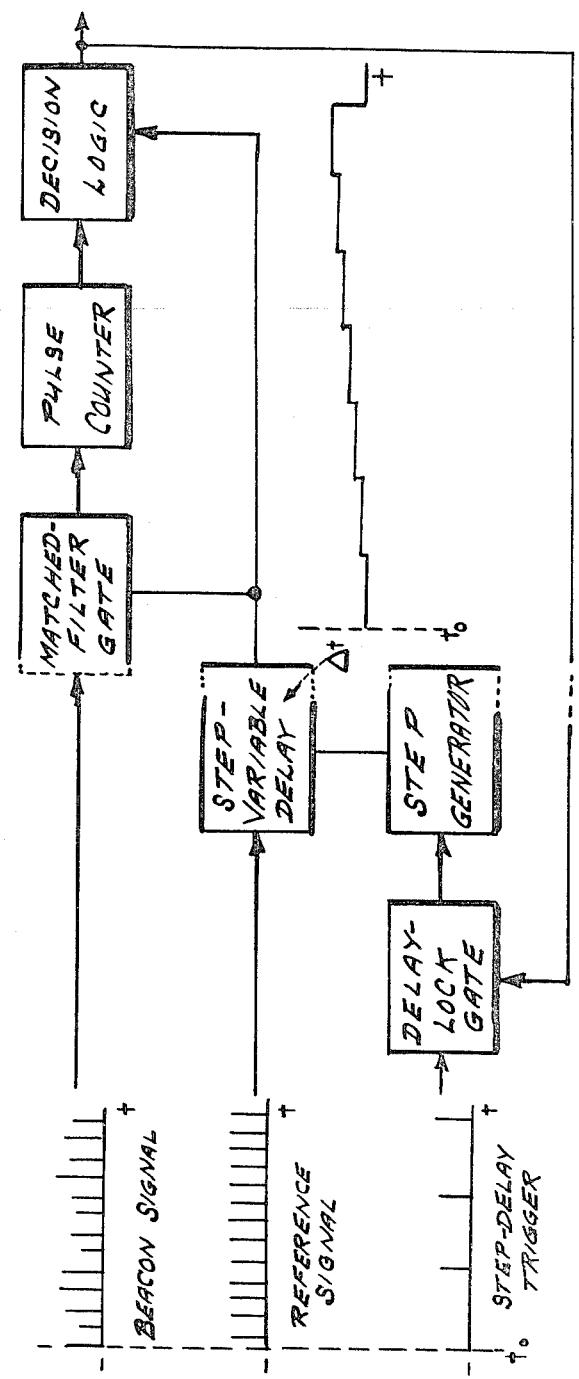

3,799,676

OPTICAL TRACKING SYSTEM

BACKGROUND OF THE INVENTION

The present invention relates broadly to an optical tracking system and in particular to a laser beam tracker apparatus utilizing a cooperating target.

Prior art optical tracking systems have been developed to follow flying bodies or other moving objects. However, these flying bodies or other moving objects are identifiable by the optical or quasi-optical (infrared) radiation which emanates from the object. Thus, these objects may be automatically followed along their path or remotely controlled along a predetermined path by means of a radiation search device. The search device continuously focuses the radiation emanating from the moving object upon an image field in the device. The coordinates of the image point which are produced by the rays on the image field determines the incidence angle of these rays relative to the optical axis of the research device. More specifically, the prior art utilizes a rotating chopper or scanner disc which exhibits alternate zones of different transparency to incident rays. The disc modulates the intensity of the rays which pass through the rotating disc according to the coordinate position of the image point in the image field. Thus, a modulated beam carrying information which determines the coordinate of the image point is provided. However, existing chopper disc provide a certain degree of inaccuracies.

SUMMARY

The present invention utilizes a radar system and an optical tracker in conjunction with a cooperating target vehicle to locate and track a flying object. Detectors which are located within the optical system process optical signal which are received from the retroreflectors mounted on the target. Azimuth and elevation photodetectors provide the coordinate data which is necessary to determine the target's position.

It is one object of the invention, therefore, to provide an improved optical tracking system having pulsed beacons with high pulse rates and precision timing.

It is another object of the invention to provide an improved optical tracking system having pulse code modulation which is immune from the effects of atmospheric path amplitude scintillations.

It is yet another object of the invention to provide an improved optical tracking system utilizing large aperture aperture optics wherein the angle of arrival of light rays from the target are spatially averaged.

It is yet a further object of the invention to provide an improved optical tracking system having the capability to determine the centroid position in a time interval which is small as compared to the amplitude fluctuations imparted by the turbulent atmospheric path.

These and other advantages, features and objects of the invention will become more apparent from the following description taken in connection with the illustrative embodiments in the accompanying drawings.

BRIEF DESCRIPTION OF THE DRAWINGS

FIG. 5 is a circuit for the correlation discriminator utilizing a known timing reference, FIG. 6 is a block diagram for the correlation discriminator utilizing a reference pulse time-lock detector.

DESCRIPTION OF THE PREFERRED EMBODIMENT

Figure 1:
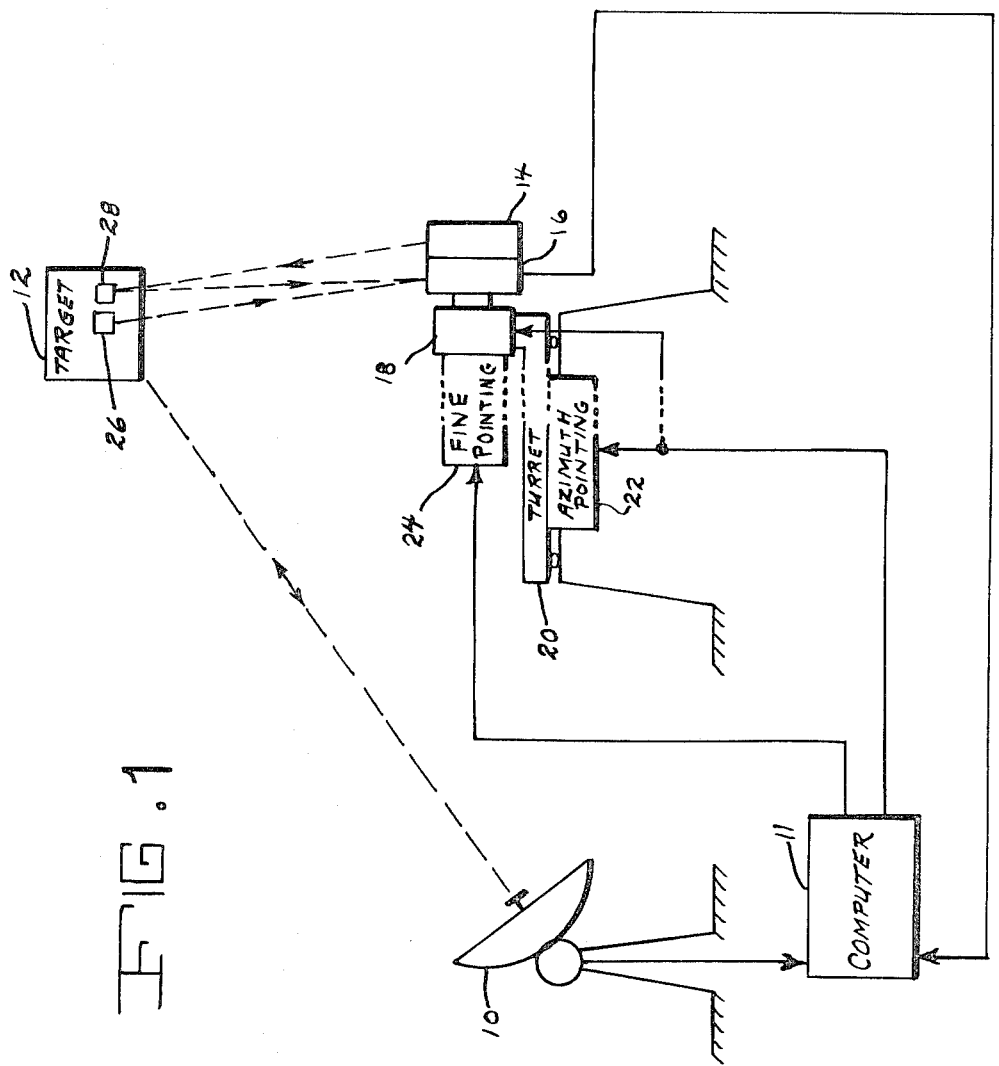
FIG. 1 is a block diagram of the optical teaching system with optical tracker mounted on a turret.

Referring now to FIG. 1, there is shown a radar system comprising radar antenna 10 and computer 11 illuminating a flying object, target 12. The preliminary target acquisition and tracking will be provided by the radar system. The fine target tracking and position determination data will be provided by the optical tracking system. The optical tracking system comprises a YAG illuminator 14 and an optical tracker 16 which are mounted together on an elevation pointing unit 18. A moveable turret 20 supports the elevation pointing unit 18 and the optical tracking system. The azimuth pointing unit 22 rotates the turret 20 in accordance with the azimuth control signal which is supplied by the computer 11. The computer 11 supplies elevation control signals to the fine pointing unit 24 which rotates in elevation the elevation pointing unit 18. Initially the elevation and azimuth information is supplied by the radar 10 to the computer 11 for processing. This received elevation and azimuth information is processed in the computer 11 into coarse elevation and azimuth data which is supplied to the elevation and azimuth pointing units, 18 and 22 respectively. The precision target elevation and azimuth information is provided by the cooperation between the optical tracking system and the target 12. The target 12 provides a laser beacon 26 which transmitts signals to the optical tracker 16 and a retroreflector 28 that reflects signals which are transmitted by the YAG illuminator 14 to the optical tracker 16.

Figure 2:
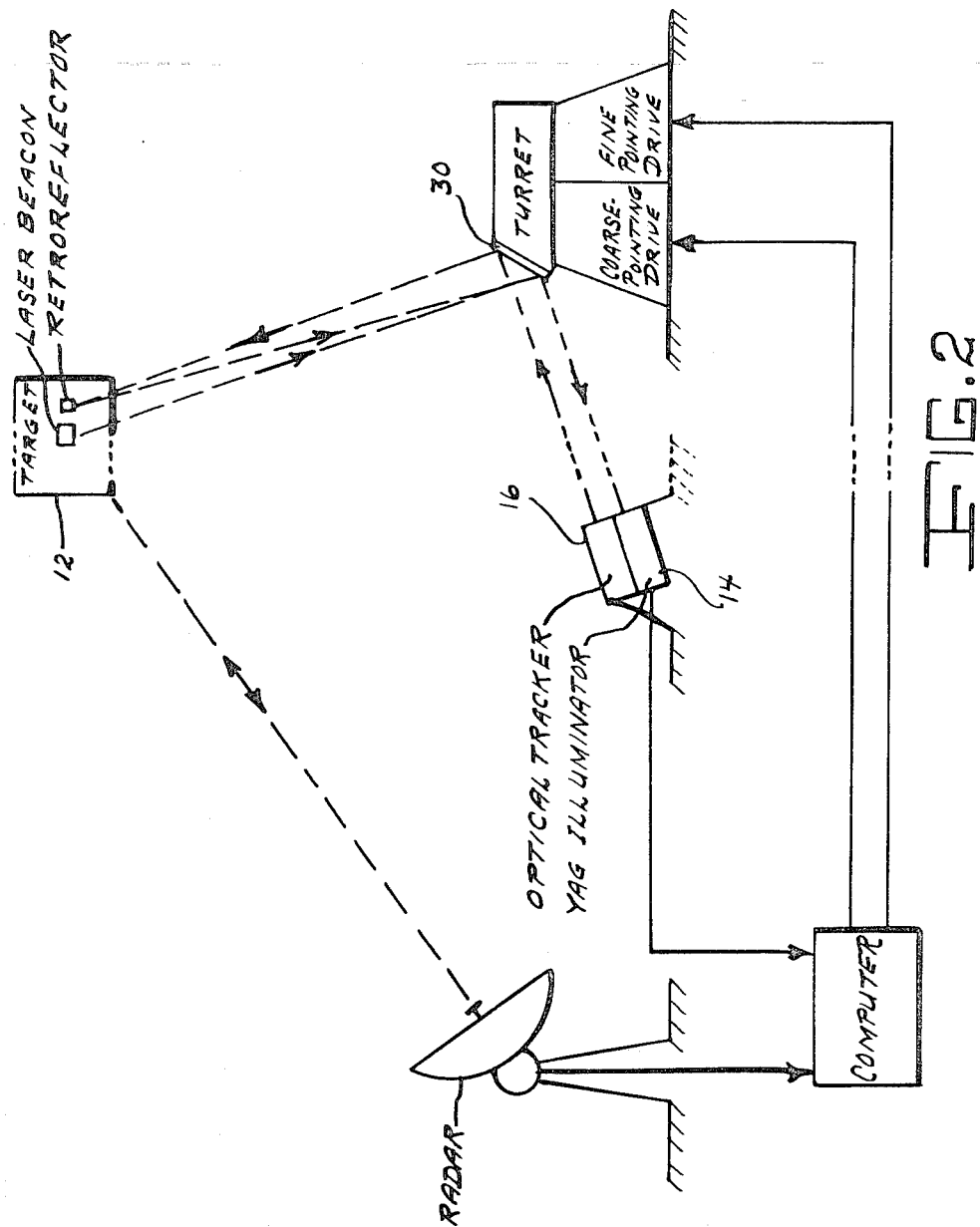
FIG. 2 is a block diagram of the optical tracking system with the optical tracker mounted on a ground pad.

There is shown in FIG. 2 a second configuration of the optical tracking system wherein the optical tracking package is rigidly mounted to a stationary ground pad. The optical tracking system which comprises YAG illuminator 14 and optical tracker 16 views the target 12 by means of a mirror 30 that is mounted on the turret. The operation of this optical tracking system is basically the same as that described in FIG. 1 with the exception of the mirror 30 which is utilized to direct the signals to and from the target 12 to the optical tracking system. The function of the optical tracker is the same in both configurations. The optical tracker is an instrument which measures the angles between the instrument's boresight and the target's line of sight. The high-accuracy optical tracker functions in cooperation with a pulsed beacon having high pulse rates and precision timing. This form of target signal permits the use of correlation techniques within the tracker, yields a new dimension of target discrimination, permits a form of target position encoding (pulse code modulation), which is relatively immune from the effects of atmospheric path amplitude scintillations, and effects an inherent linearity over the field of view, not subject to drifts nor requiring calibraions. Additionally, large aperture tracker optics have been utilized when large aperture optics are used, turbulence-induced fluctuations in the angle-of-arrival of light rays from the target are spatially averaged and while the image blur may pulsate in size (and possibly in shape), the center of the image blur does not dance about in position of the target's image blur centroid. Ideally, one desires to determine the angular position of the target's image blur centroid, by means which are completely insensitive to amplitude scintillations and component drifts. Such ideal embodiments of this concept as have been envisioned, appear to be discouragingly complex and sophisticated. However, one rather simple embodiment has been envisioned which holds promise of being substantially insensitive to amplitude scintillations. In essence, the idea is to determine the centroid position in a time interval which is small compared to the amplitude fluctuations imparted by the turbulent atmospheric path.

For stationary targets, the characteristic frequency of the amplitude scintillation spectrum may be as high as 100–200 Hz as determined by the atmospheric structure constant, Cn, over the path length, which in turn is related to cross-wind speed. For fast moving targets, the characteristic frequency of amplitude scintillations will be correspondingly higher. A tenative design objective of 0.5 – 1.0 m sec for the time interval in which the centroid position is determined, appears to offer an adequate scope for initial target speeds and trajectories.

The target 12 which includes a laser beacon to provide the target's line of sight utilizes a GaAs laser beacon. The recent development of GaAs laser arrays for NIR illuminator applications has brought the state-of-the-art to the point where such arrays may be utilized for the beacon application. Arrays of 400 laser elements have provided a pulsed radiant output of 1 kilowatt (peak) in a 100 A spectral band centered at 8,550 A. The size and configuration of the arrays readily permit the projection of their total output into a 20° coverage cone, or alternatively, into a one steradian cone using small diameter optics (approximately 2.0 inch). A pulse rate of 50K pps is achievable at a pulse duty factor of 2 percent (pulse width of 0.4 $\mu$sec). Pulse timing is highly precise. The efficiency of the arrays (20–50 percent) permits cooling for 77°K operation with a modest amount of liquid nitrogen, or a closed cycle cryogenics system. The complete system, including the cryogenics, is mounted within the target vehicle for airborne use.

The optical system which comprises a YAG laser illuminator 14 and an optical tracker 16 which are mounted together on the ground installation cooperate with small retro-reflectors which are mounted on the various targets. Clearly, retroreflectors are quite small in size and light weight for beacon usage. YAG lasers which may be utilized in the YAG illuminator 16 are commercially available with 100 watts CW output at 106 $\mu$. The device is amenable to Pockel's cell Q-switching within its cavity with precise timing and at high pulse rates. Peak powers inversely proportional to pulse duty factor are expected; such as several kilowatts peak. This output may be confined, with external optics, to a nominal 2 m rad beam width. Power and cooling requirements of the pulsed YAG laser illuminator 16 are readily accomplished at a ground installation.

The optical tracker comprises three major subsections, (a) the telescope optics, (b) an electro-optical section composed of relay optics, spectral filters, field lens, reticle position encoder, reticle drive, and photo detectors and (c) an electronics section wherein various discriminations and other data processing functions are performed. In the tracker telescope section, large aperture optics are utilized to significantly reduce the angular position scintillation of a point target image when viewed through a turbulent atmospheric path. The signal-to-noise ratio and increased range is improved through the use of large tracker optics.

Figure 3:
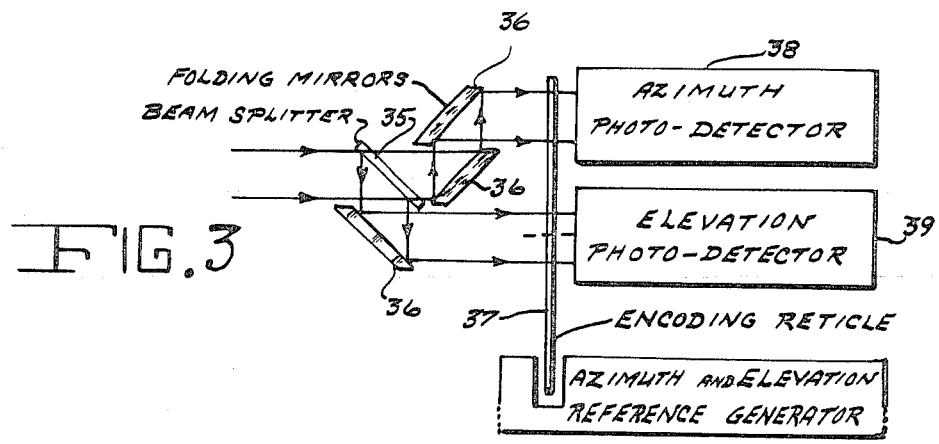
FIG. 3 is a block diagram of the electro-optical assembly for the centroid tracker.

The position encoding of the target's pulse train is accomplished in the electro-optics section. In FIG. 3 there is shown a pulse code modulation technique for high pulse rate target sources.

The optical field, following the tracker's telescope optics, is branched by a beam splitter 35 and folding mirrors 36 having equal path lengths. A reticle 37 encodes orthogonal positions alternatingly. An azimuth photo-detector 38 and an elevation photo-detector 39 read the position-encoded optical signals. The position encoding reticle 37 is shown in greater detail in FIG. 4. The reticle pattern consists of sets of two radial opaque bars 40. The bar patterns alternatingly scan the branched image planes. Position references are generated by the same reticle. The geometrical design of the recticle and the branched image planes is such that the pulsed target signal is always incident on, at least, one photo-detector. The summed signals from the photo-detectors synchronizes the tracker's processing electronics. The position-encoded signals from the individual photo-detectors are each processed through various discrimination circuitry and thence through centroid-determination logic.

Tracker systems using a pulsed illuminator, are amenable to correlation-discrimination techniques for the improvement of S/N ratio. The precise signal pulse rates which are required, are obtainable with GaAs laser arrays or a YAG laser. There is shown in FIG. 5 an illustration of the rectroreflector/YAC illuminator system wherein the time-of-arrival of signal pulses is precisely predictable. The incoming signal with noise is gated by the predicted reference signal, performing the function of a matched-time filter. The correlated output signal contains far fewer false pulses. Further improvement in the S/N ratio may be obtained by decision logic. For example, the decision for target identification may require the occurrence of three pulses, out of a possible four consecutive pulses. In general, the logic would be designed to strongly discriminate against spurious pulses, without failing to identify the presence of a true signal even with occasional true signal pulse dropouts.

In the case of a pulsed-beacon/tracker system, the time-of-arrival of signal pulses is unknown; unless, of course, an auxiliary radio channel were proveded. However, such a system complexity is not needed because the rate-of-arrival of signal pulses is still precisely known. There is shown in FIG. 6 a detection circuit which includes a matched filter for the beacon signal and also includes a reference pulse time lock detection circuit. The reference pulse time lock detection circuit extends applicability to the case of the pulsed-beacon/tracker system. The reference-pulse train is derived from the sum of the signals impinging on the two photo-detectors 38, 39 (FIG. 3). This reference pulse train is stepped, sequentially, through a range of delays produced by the step-variable delay. The step generator causes the step variable delay to produce incremental steps in delay which are comparable to the widths of the signal pulses. The period of each incremental delay step is larger than the period between signal pulses, and is controlled by the periodic step delay trigger pulses. Thus, an incremental step in delay is produced for each step-delay trigger input. At that particular time when the stepped delay causes a time-coincidence of the beacon signal pulses and the reference signal pulses at the matched filter gate, a correlated output signal occurs. The correlated output signal is fed back to the delay lock gate and inhibits that gate from passing further input trigger pulses. Thus, the step-generator ceases to step further, and the step variable delay locks at that value of delay which caused the matched filter output signal. If reference lock is lost, the step-variable delay automatically recycles until synchronization is regained.

Figure 7:
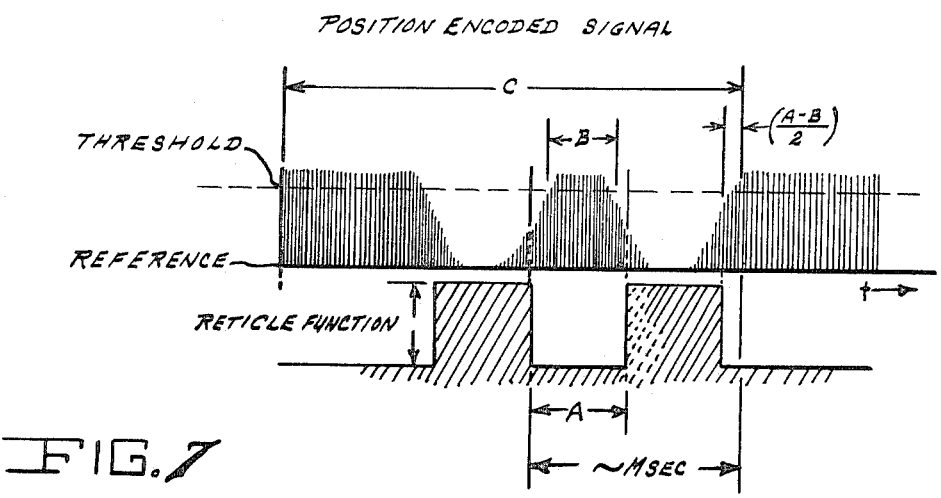
FIG. 7 is a graphic representation of the centroid position determination.

Turning now to FIG. 7, the centroid determination is accomplished in the following manner. The image blur diameter above a fixed (or AGC) threshold is first measured, simply by counting pulses. In FIG. 7, this is the quantity $A - B$. The position of the image center from the reference (in that coordinate direction), is then measured and computed. In FIG. 7, this is the quantity $C - [(A - B)/2]$. The measurement and computation of the centroid position is completed within 1 millisecond (or less) of the time of the blur diameter measurement. This time interval should be faster than the amplitude fluctuations caused by atmospheric turbulence. The processing alternates between signals representing the reticle's orthogonal scanning coordinates. Thus, the position of the centroid of the image blur is determined for each successive pair of readings. The rate of determining the centroid position may be as high as 100 per second, using a target beacon pulsed at 50 Kpps.

Figure 4:
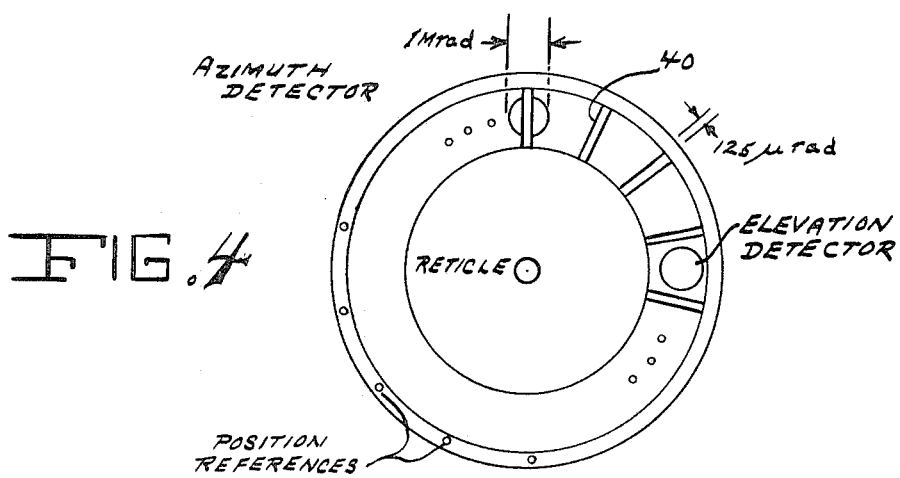
FIG. 4 is a front view of the encoding reticle for the centroid tracker.

In the encoding reticle design which was illustrated in FIG. 4, the width and separation of the opaque bars is shown as subtending 125 μrad in the image field of 1 mrad. This value was chosen on the basis of very preliminary experimental measurements of image blur diameters under very bad "seeing" conditions, over short ranges with a large aperture telescope. The design of the bar widths in a compromise between being wide enough to substantially occlude the largest expected image blurs while being narrow in order to minimize the time interval during which the centroid position is measured and computed. In an alternative embodiment, it may be possible to insert field lens before the reticle in order to change the relative angular dimensions of the reticle bar pattern and the image field. The appropriate field lens could be selected in accord with seeing conditions.

The electro-optics section contains spectral filters for reducing or eliminating response from sky background irradiance. When used with the GaAs laser array beacon, a filter width of 100 A centered at 8,550 A appears appropriate. When used with a YAG laser illuminator, it is expected that the filter width may be quite narrow, say 10 A, centered at 1.06 μ. Sky background radiance values have been judiciously chosed, weight being given to the experimental values which were available. These values for approximately 10° elevation angle, at the beacon wavelengths are:

Background Radiancs

For GaAs beacon    $8 \times 10^{-8}$ w/cm²-st-A
For YAG illuminator    $2 \times 10^{-8}$ w/cm²-st-A The choice of photo-detectors for the tracker is dependent upon the factors of sensitivity, size, and availability. Presently, the maximum sensitivity for the GaAs beacon may be obtained with photo-multipliers having photo-cathodes of S-25 or GaAs—Cs$_2$O, with quantum efficiencies of 2 percent and 10 percent respectively. In the presently available photo-detector which may be used with the YAG laser illuminator, the maximum sensitivity may be obtained with InAs P—Cs$_2$O photo-cathodes[4], having quantum yields of 1 percent.

A range equation has been derived for the GaAs beacon/tracker system. In the analysis, it was presumed that the various discrimination techniques render the system insensitive to sky background radiance transients and other spurious signals, and is detector noise limited. The transmission factor of the optics is neglected.

$$R^2 = [P_t D^2 Y/16 (\sin O_b)^2 \text{ S/N NEP (BW)}^{1/2}]$$

where:

$P_t$ = beacon peak power (watts) = 1 Kw
$D$ = diameter of tracker aperture (M) = .38 M
$Y$ = atmospheric transmission factor
$O_b$ = beamwidth of target beacon = 57.3°
S/N — peak signal-to-4 times RMS Noise Ratio = 10

NEP = photo-multiplier noise-equivalent-power - $8 \times 10^{-15}$ w/Hz (Quantum eff. = 5 percent)
Bw = bandwidth — 4 MHz Solution of this range equation shows that beacon power and beamwidth are quite adequate for the application.

|  | Range |
|---|---|
| For Vacuum Path | 400 KM |
| For Clear Path (VMR - 22-45 Km) | 41 Km |
| For Hazy Path (VMR - 4.5-11 Km) | 16 Km |

In the latter case, for the hazy path, wherein the atmopsheric transmission factor, $$Y = 1.6 \times 10^{-3},$$

it appears likely that the range would be limited more severely by beacon image blurring, rather than signal-to-detector noise limitations.

The range equation for the YAG illuminator/retro/-tracker system, under assumptions similar to that of the GaAs beacon/tracker system, is given by:

$$R^4 = (4 P_t d^2 D^2 Y^2/O_t^2 O_{refl}^2 \text{ S/N NEP (BW)}^{1/2})$$

where:

$P_t$ = Illuminator peak power = 5 Kw (assuming $P_{av}$ = 100 w, PRF = 50 Kpps and $w$ = 0.4 μs)
$\rho$ = reflectance of retroreflector = 0.8
$d$ = diameter of retroreflector = 0.05 M
$O_t$ = beamwidth of YAG illuminator = 2 mrad (2 times tracker FOV)
$O_{refl}$ = reflected beamwidth of retroreflector,
    = $(d/R) +^o {}_{retro} + O_{atmosphere}$. At longer ranges and for poor seeing conditions.
$O_{refl} = O_{atmosphere}$ = angular dispersion from retro caused by turbulence (assumed to be 100μrad).
NEP = Noise Equivalent Power of photo-multiplier
    = $8 \times KO^{-13}$w/Hz ($S$ −1, quantum eff. =0.05 percent)

S/N = Peak signal-to-4 times RMS detector no se = 10,

BW = bandwidth = 5 MHz

The solution of this range equation yields the following values:

|  | Range |
|---|---|
| For Vacuum Path | 300 Km |
| For Clear Path (VMR - 22-45 Km) | 43 Km |
| For Hazy Path (VMR - 4.5-11 KM) | 18 Km |

Thus it may be seen that on a power and signal to-noise basis, the ranges are suitable for the present application. However, the realizable range under hazy conditions may be more seriously limited by forward scatter thereby causing target image blurring.

While in accordance with the provision of the statutes we have illustrated and described the best forms of the invention now know to us, it will be apparent to those skilled in the art that changes may be made in the form of the apparatus disclosed without departing from the spirit of the invention as set forth in the appended claims, and that in some cases certain features of the invention may be used to advantage without a corresponding use of other features.

I claim:

1. An optical tracking system for tracking a cooperating target comprising in combination:

a target having a laser beacon and a retroreflector, said laser beacon having a laser output signal, an optical tracking unit in optical alignment with said target, said optical tracking unit comprising a YAG illuminator and an optical tracker, said YAG illuminator having a laser beam output, said laser beam output being transmitted to and reflected by said retroreflector to said optical tracker, said laser output signal from said laser beacon being transmitted to said optical tracker, said optical tracker having an optical unit to split said laser beam into an azimuth signal and an elevation signal, said azimuth signal being applied to an azimuth photo-detector, said elevation signal being applied to an elevation photo-detector, said optical tracker having a reference generator to provide azimuth and elevation reference signals to said azimuth and elevation photo-detectors respectively, said azimuth and elevation photo-detectors providing output data respectively, said optical tracker providing elevation and azimuth data, and, means for optically aligning said optical tracking unit with said target, said optical aligning means being responsive to said elevation and azimuth data signals.

2. An optical tracking system as described in claim 1 wherein said means for optically aligning said optical tracking unit comprises:

a turret rotatably mounted on a ground pad, said turret being rotated by an azimuth pointing unit, said azimuth pointing unit being responsive to said azimuth control signal from said computer, said turret supporting an elevation pointing unit, said elevation pointing unit being rotatably mounted in elevation on said turret, said elevation pointing unit receiving said elevation control signal from said computer, said optical tracking unit being mounted on said elevation pointing unit.

3. An optical tracking system as defined in claim 1 wherein said means for optical aligning said optical tracking unit comprises:

a turret having a mirror mounted thereon, said turret being rotatably mounted upon a coarse pointing unit and a fine pointing unit, said coarse and fine pointing units respectively receiving said elevation and azimuth control signals from said computer, said mirror providing the optical alignment between said optical tracking unit and said target, said optical tracking unit being mounted to a stationary ground pad.

4. An optical tracking system as described in claim 1 wherein said optical tracking unit includes a correlation-discriminator to process said azimuth and elevation signals to provide position data, said correlation-discriminator comprises a matched-filter gate to receive said azimuth and elevation signals, said matched-filter gate receives a reference gate signal derived from said azimuth and elevation photo-detector output data, said reference gate signal gating said matched filter gate to provide a correlation signal, said correlation signal being applied to a pulse counter, said pulse counter counting the pulses in said correlation signal and providing a count output signal in response thereto, a decision logic unit receiving said reference gate signal and count output signal to determine a target match, said decision logic unit providing a target correlation signal when said reference gate signal and count output signal coincide.

5. An optical tracking system as described in claim 4 wherein said correlation-discriminator further includes a step-variable delay unit to receive said reference gate signal, said step-variable delay unit sequentially stepping said reference gate signal through a predetermined range of delays, a delay lock gate receiving a step-delay trigger, said delay lock gate providing an output signal in response to said step-delay trigger, a step generator receiving said delay lock gate output signal and providing a step output signal, said step output signal being applied to said step-variable delay unit, said step-variable delay unit providing an incremental step-delay output, said step-delay output being applied to both said matched-filter gate and said decision logic unit, said delay lock gate receiving said target correlation signal, said delay lock gate being inhibited when said target correlation signal occurs.

* * * * *